United States Patent [19]
Marberg et al.

[11] Patent Number: 5,943,692
[45] Date of Patent: Aug. 24, 1999

[54] MOBILE CLIENT COMPUTER SYSTEM WITH FLASH MEMORY MANAGEMENT UTILIZING A VIRTUAL ADDRESS MAP AND VARIABLE LENGTH DATA

[75] Inventors: John M. Marberg, Haifa, Israel; Brent A. Miller, Cary, N.C.; Julian Satran, Haifa; Dafna Sheinwald, Nofit, both of Israel

[73] Assignee: International Business Machines Corporation, Armonk, N.Y.

[21] Appl. No.: 08/848,372

[22] Filed: Apr. 30, 1997

[51] Int. Cl.$^6$ .............. G06F 12/04; G06F 12/10; G06F 13/00; G11C 16/00
[52] U.S. Cl. .......... 711/203; 711/103; 365/185.29; 365/185.33
[58] Field of Search .............. 711/103, 170, 711/171, 173, 202, 203, 206, 209; 707/205, 206; 365/185.29, 185.33

[56] References Cited

U.S. PATENT DOCUMENTS

| | | | |
|---|---|---|---|
| 5,337,275 | 8/1994 | Garner | 365/185.29 |
| 5,404,485 | 4/1995 | Ban | 711/202 |
| 5,457,658 | 10/1995 | Niijima et al. | 711/103 |
| 5,459,850 | 10/1995 | Clay et al. | 711/171 |
| 5,473,765 | 12/1995 | Gibbons et al. | 395/500 |
| 5,479,633 | 12/1995 | Wells et al. | 711/103 |
| 5,682,497 | 10/1997 | Robinson | 711/103 |
| 5,696,926 | 12/1997 | Culbert et al. | 711/203 |
| 5,737,742 | 4/1998 | Achiwa et al. | 711/103 |
| 5,805,157 | 9/1998 | Bertram et al. | 345/339 |
| 5,812,930 | 9/1998 | Zaurel | 455/5.1 |

*Primary Examiner*—Glenn Gossage
*Attorney, Agent, or Firm*—Anthony N. Magistrale; Daniel E. McConnell

[57] ABSTRACT

A computer system such as a mobile client system in which provision is made for management of flash memory. Flash memory management is done using variable block length and supports data compression. Blocks are allocated contiguously in each erase unit and each block starts with a header that contains the length of the block. Blocks are tracked using a single-level virtual address map which resides in random access memory (RAM). The mobile computer system may also include a housing, processor, random access memory, display and an input digitizer such as a touchscreen.

15 Claims, 11 Drawing Sheets

MOBILE CLIENT COMPUTER SYSTEM WITH FLASH MEMORY MANAGEMENT UTILIZING A VIRTUAL ADDRESS MAP AND VARIABLE LENGTH DATA

BACKGROUND OF THE INVENTION

Personal computer systems in general and International Business Machines Corporation (IBM) personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as Video Electronics Standards Association (VESA) and Peripheral Component Interconnect (PCI) bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

As will be understood, the environments of use of mobile client systems typically require that such systems be powered by batteries. Long service life per battery charge is dependent upon demands made on the batteries for power. Thus designing for reduced power demand is significant in the development of such systems.

SUMMARY OF THE INVENTION

With the foregoing as background, the present invention contemplates a mobile client system in which provision is made for management of flash memory.

In realizing this purpose of the present invention,

BRIEF DESCRIPTION OF THE DRAWINGS

Some of the purposes of the invention having been stated, others will appear as the following description proceeds, when taken in connection with the accompanying drawings, in which.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
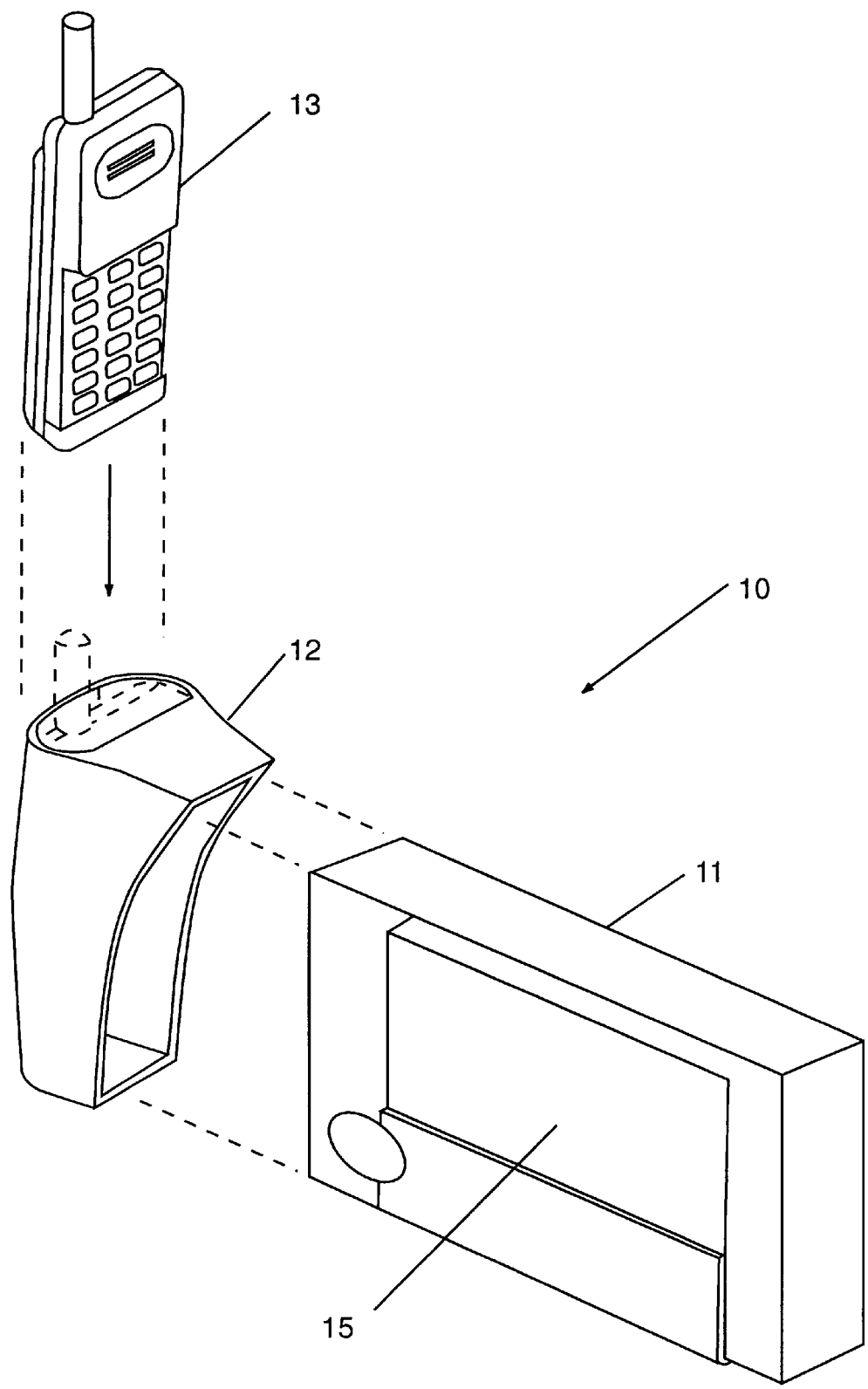
FIG. 1 is an exploded perspective view of certain elements of a mobile client computer system in accordance with this invention.
Figure 2:
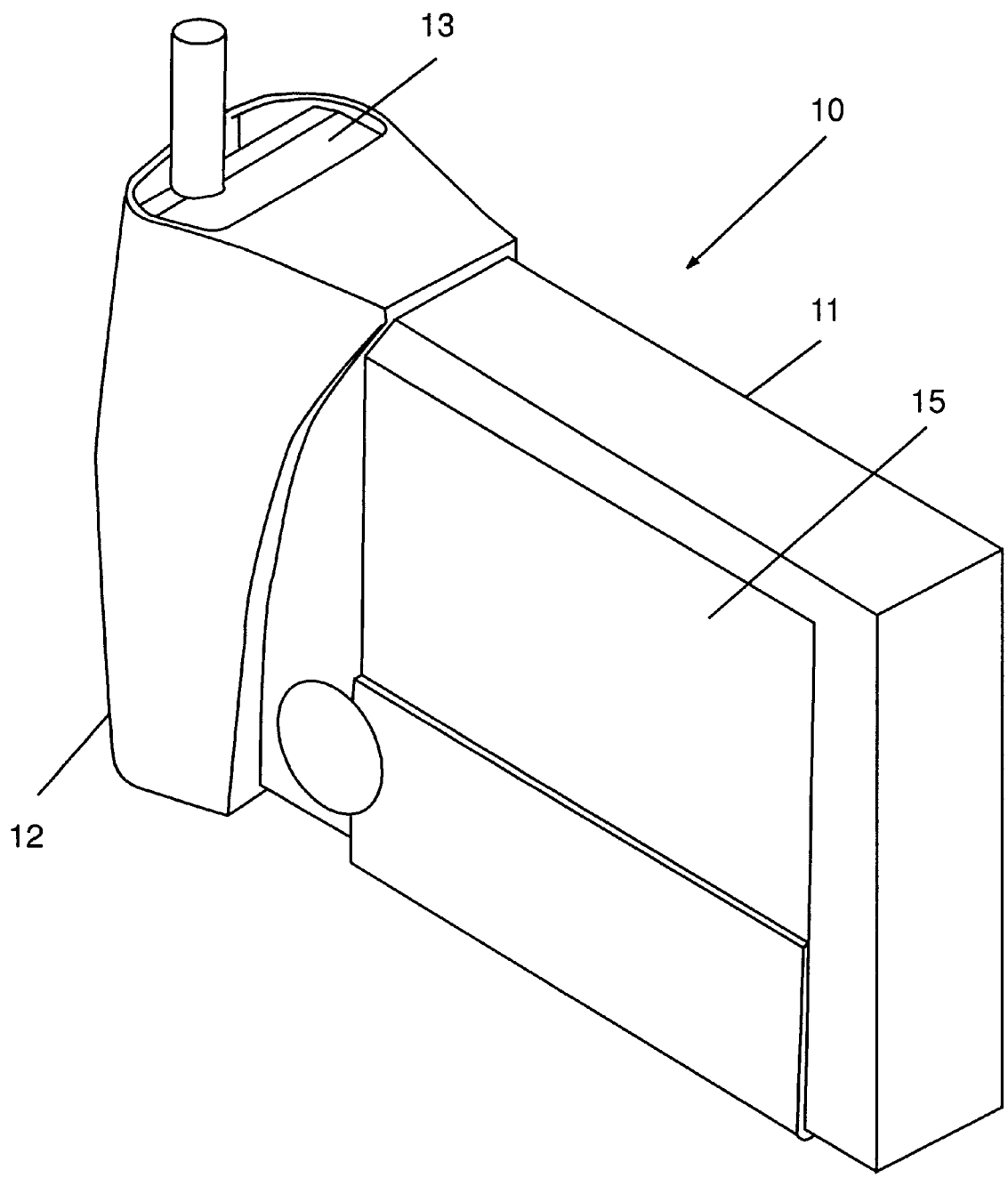
FIG. 2 is a perspective view of the mobile client system of FIG. 1 as assembled for use.
Figure 3:
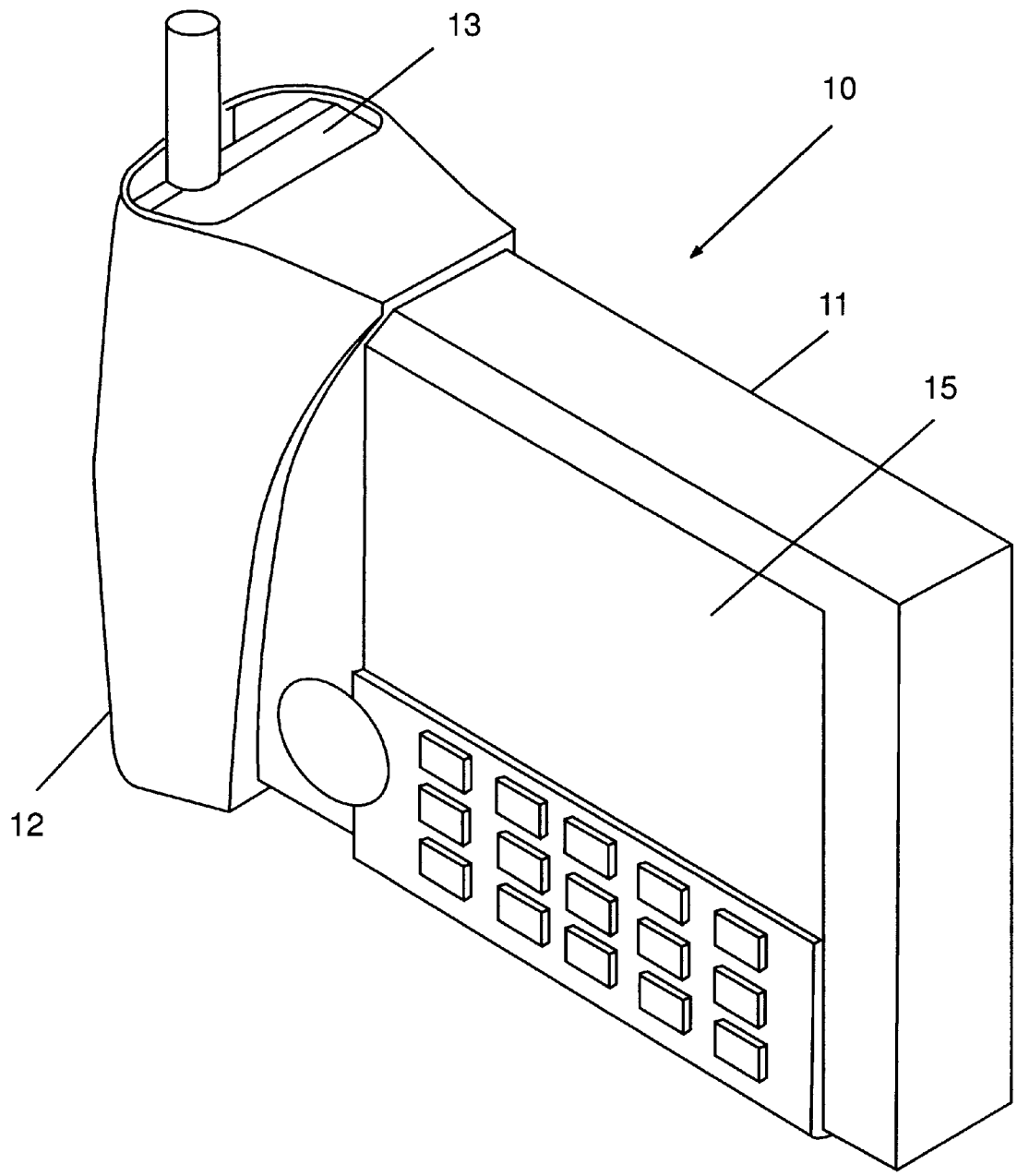
FIG. 3 is a view similar to FIG. 2 showing an alternate form of organization for the mobile client system of FIGS. 1 and 2.

Referring now more particularly to the accompanying Figures, FIGS. 1 through 3 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. The system tablet may optionally have an integrated keypad. While thus illustrated and here described as a three component system, it will be understood that many of the advantages of this invention as described hereinafter can be realized where the mobile client system 10 is unified.

That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

The distinctions between the systems of FIGS. 2 and 3 lies in the direct inclusion, in the system of FIG. 3, of a keypad apart from a touchscreen implementation of entry fields. This illustrates the flexibility of providing for both types of user input.

An advantage realizable with the tripartite organization is the ready substitution of one radio transceiver for another in order to accommodate various wide area networks (WANs) or local area networks (LANs). More particularly and as examples of WAN technology, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 4:
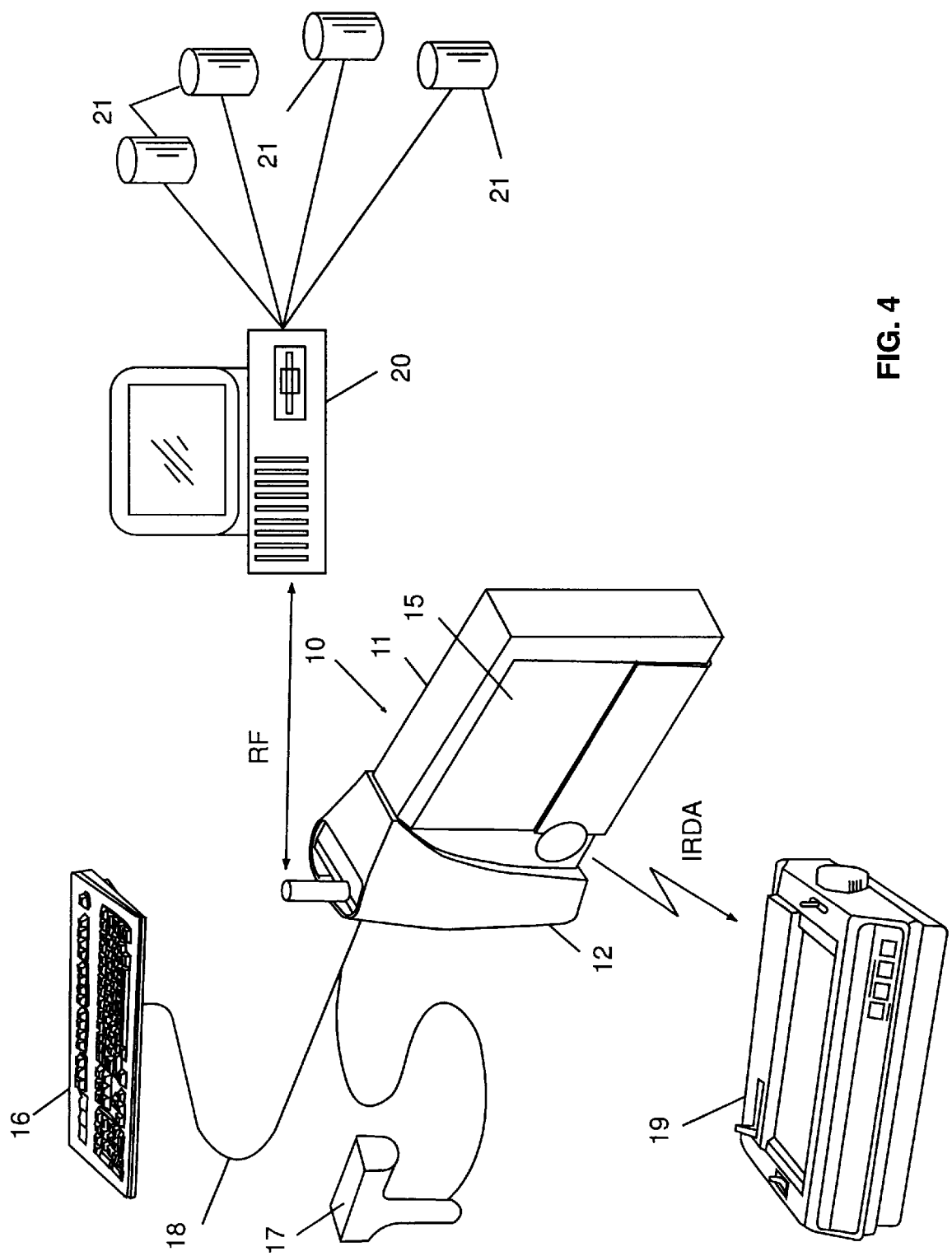
FIG. 4 is a diagrammatic representation of relationships among a mobile client system as shown in FIGS. 1 through 3 and supporting peripherals and systems.

Turning now to FIG. 4, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate other user input devices including a more conventional keyboard 16 and a bar code scanner 17. The user input device may be, as illustrated, wire tethered to the system 10 when desired for use, with the tethering conductors 18 providing signal pathways for data input to reach the system 10. As will be expanded upon hereinafter, the present subject invention is particularly concerned with an interface for such a user input device. Alternatively, a keyboard or other device such as the scanner may be linked for data transfer by other means known to persons of skill in the art, such as by direct integration as described above or an infrared link using a known protocol. By way of example and as illustrated in the drawing, the system is shown linked to a printer 19 by an IrDA link for data transfer by infrared radiation. While this is exemplary of an output device, similar technology is useful for linking an input device.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 5:
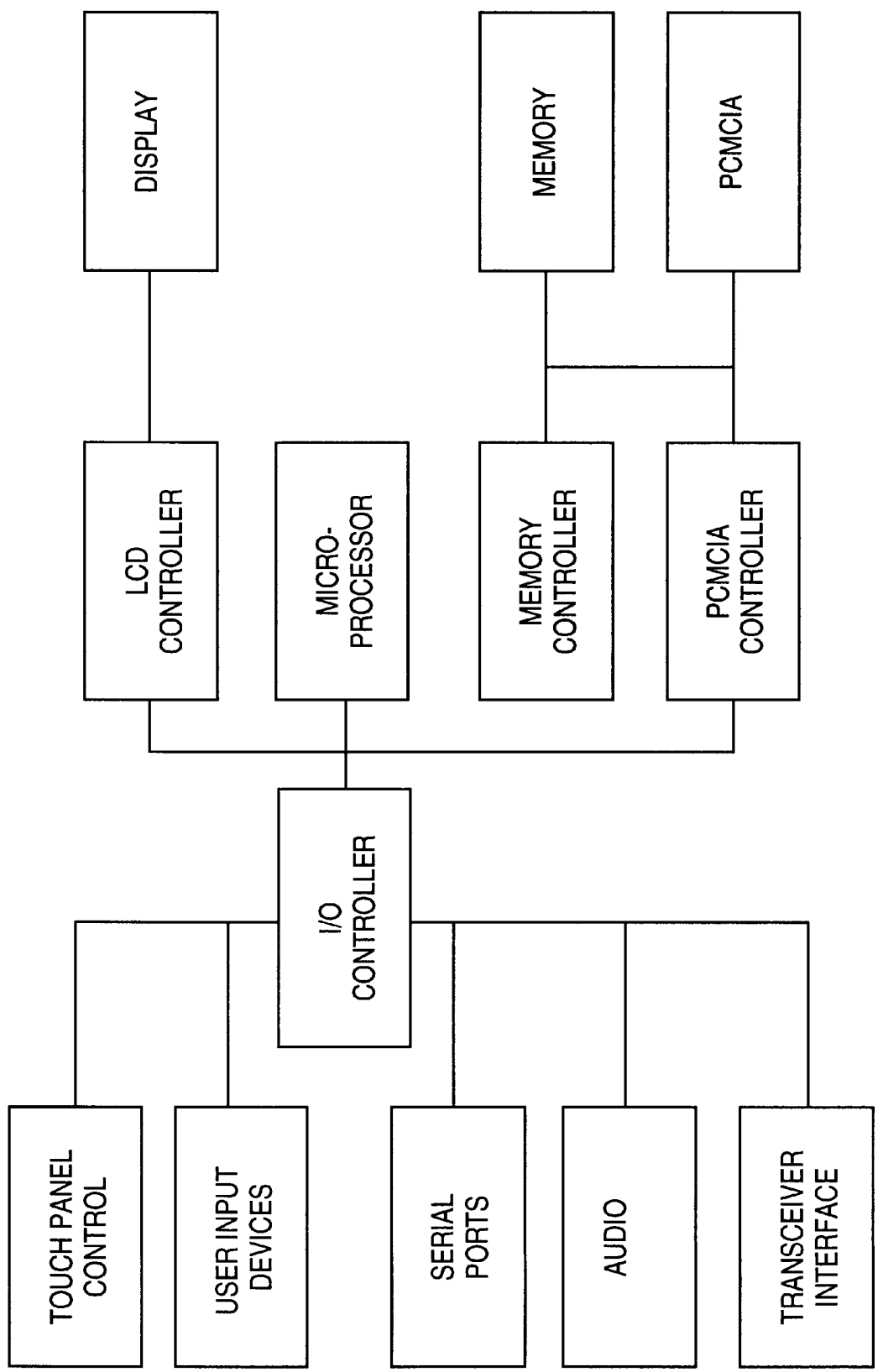
FIG. 5 is a schematic showing of certain circuitry elements embodied in the mobile client of FIGS. 2 and 3.
Figure 6:
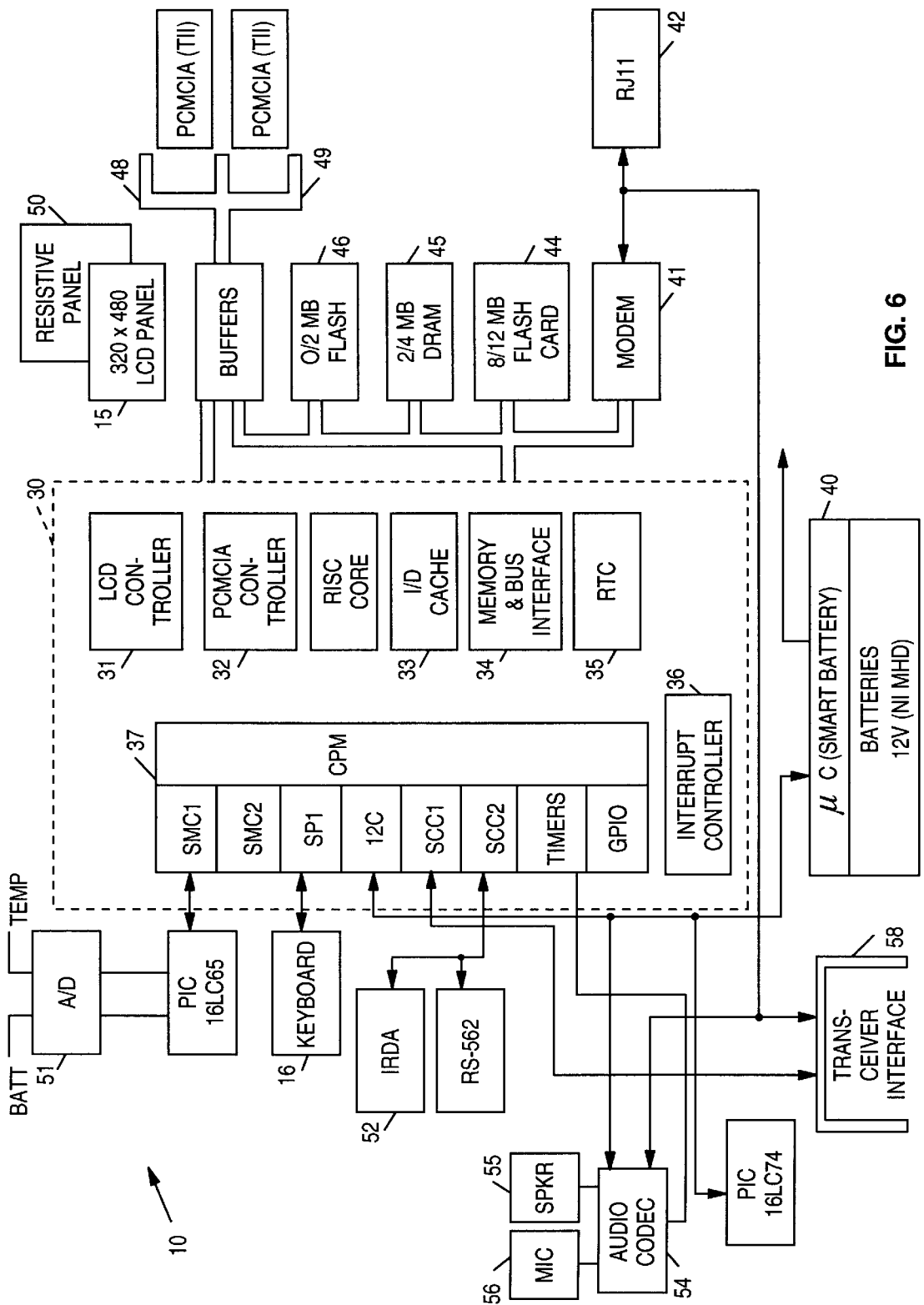
FIG. 6 is a view similar to FIG. 5 showing alternate circuitry elements.

Turning now to the circuitry elements which together accomplish the processing of data in accordance with this invention, FIGS. 5 and 6 illustrate forms of organization of such elements.

As shown in FIG. 5, which is somewhat simplified for purposes of illustration, the circuitry elements will include a central processing unit (CPU) or microprocessor and an associated input/output controller (IOC). The input/output controller is a programmable microcontroller which may be partitioned as a portion of the central processing unit, as is known to persons skilled in the design and fabrication of microprocessors. In the accompanying drawings, the IOC is sometimes identified as a peripheral microcontroller or by the acronym CPM. Certain of the elements provided, such as a memory controller, memory, a Personal Computer Memory Card Interface Association (PCMCIA) controller and associated card (if present) will be operatively coupled to the CPU and accessible to both the CPU and IOC. Others of the provided elements, such as the touchpanel control, user input devices, serial and audio ports and the transceiver interface, will be operatively coupled to the IOC and gain access to the CPU through the IOC.

As shown in FIG. 6, the illustrated mobile client system 10 has at its core a central processing unit (CPU) in the form of a microprocessor (indicated at 30) which uses reduced instruction set computing (RISC) characteristics. The CPU or processor has elements which include a controller 31 for a liquid crystal display (LCD); a controller 32 for peripherals of the type known as PCCards or PCMCIA cards; instruction/data cache 33; an interface to memory and an external bus 34; and a real time clock 35. The microprocessor also has an interrupt controller 36 and an input/output controller core 37 which defines interfaces for a variety of services. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 6 is offered as exemplary of a system in accordance with this invention, it is known that the core functionality of such a mobile client system can be otherwise configured. Similarly, while here described with reference to a handheld mobile client system, the functionality here described is attainable in other more conventional systems such as a desktop or notebook system.

As indicated in FIG. 6, the core microprocessor 30 is supported by peripherals. Power for operating the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM or RAM) 45; and by core flash memory 46. As will be brought out more fully hereinafter, the present invention is particularly related to management of the flash memory, either in the accessory card 44 or the core memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector (transceiver I/f) 58 for the radio transceiver 13 (shown in FIG. 2).

As was pointed out hereinabove, it is to be understood that the specific organization of functions here described with reference to FIGS. 5 and 6 may be varied due to a designer's choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 7, to which reference is had in the following description of power management relationships. As will be understood, the management of power usage by a mobile client system is significant with regard to usability of the system.

Figure 7:
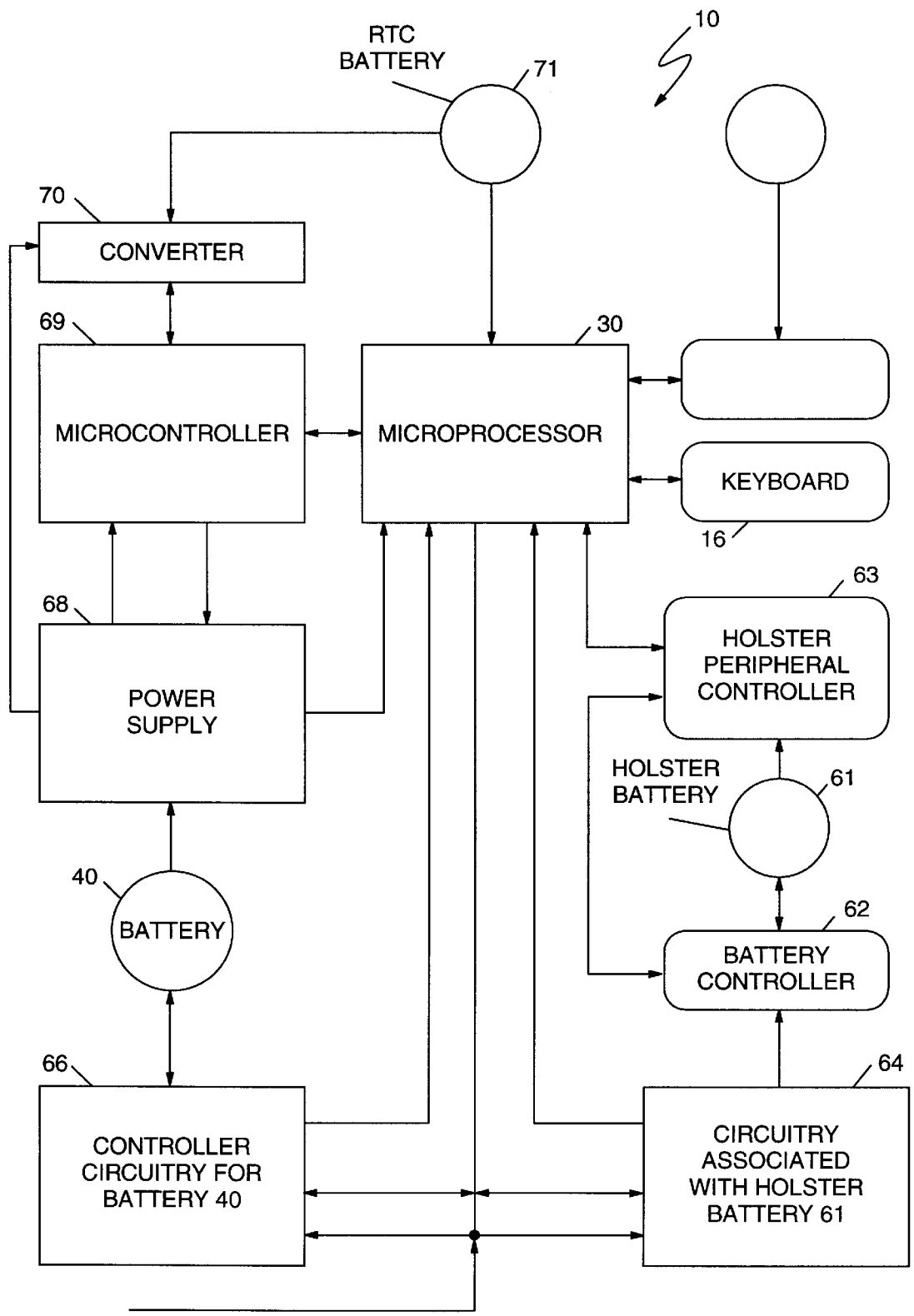
FIG. 7 is a schematic showing of certain circuitry elements and their relationships in the mobile client of FIGS. 2 and 3.

FIG. 7 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 8:
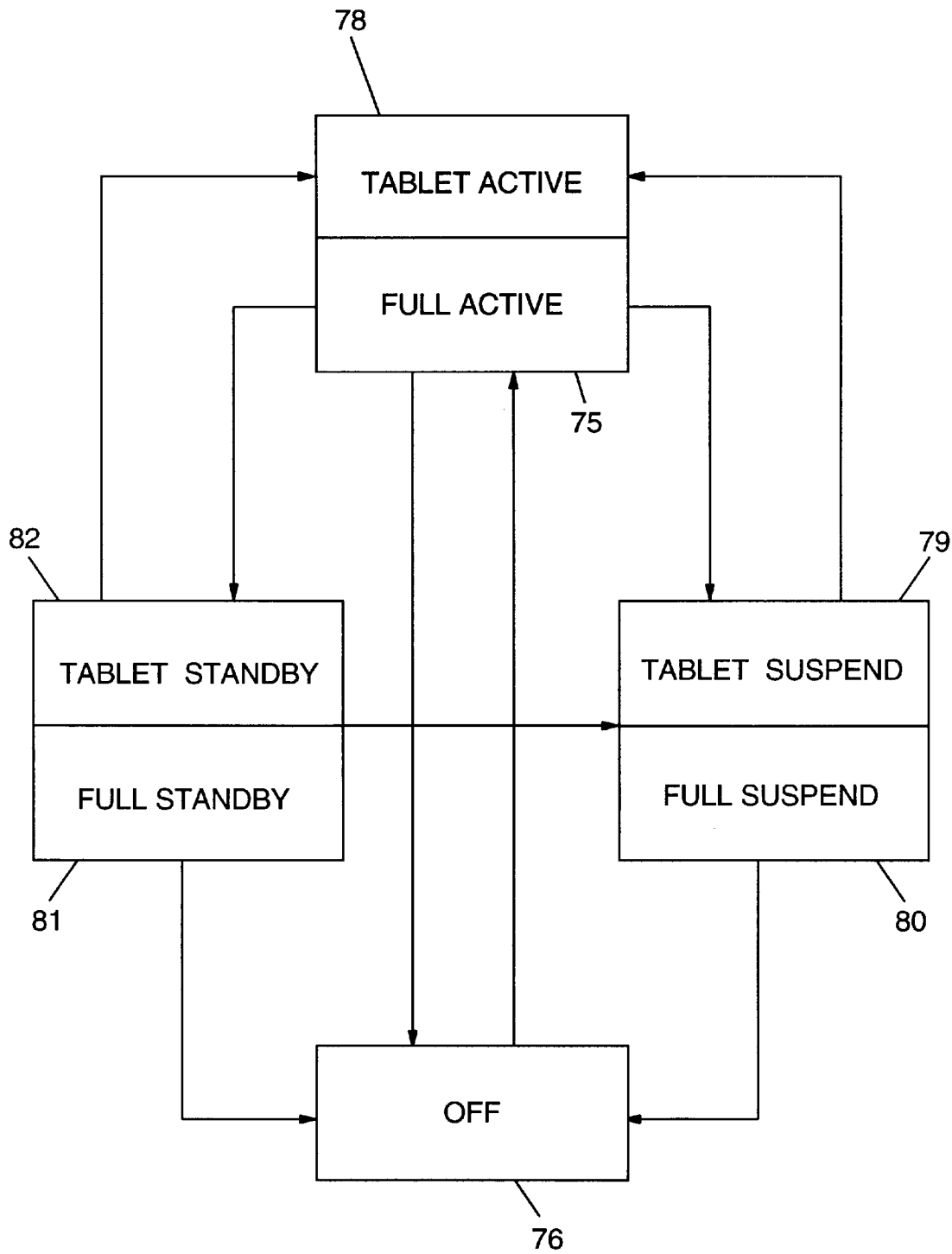
FIG. 8 is a state diagram of power modes for the mobile client of FIGS. 2 and 3 and transitions among them.

Turning now from the hardware topology to a discussion of the power modes and transition events for the mobile client system 10, FIG. 8 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, an indicator for the holster 12, and an indicator for the transceiver 13. In FIG. 8, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21 (see FIG. 4). Upon an occurrence determined by software executing on the mobile client system, the system may enter a state known as suspend. In the full suspend state, indicated at 80, the tablet LED and LCD and the holster LED are dark. Should it be appropriate for the radio transceiver to be used while the remainder of the tripartite system remains in suspend state, then the system can enter a state indicated at 79 in which the holster LED is illuminated and the transceiver functional. Similarly, upon an occurrence determined once again by software executing on the mobile client system, the system may enter a state known as standby, indicated at 82. In standby, the tablet LCD will be darkened to save power, while the tablet LED will remain illuminated to indicate that the system can be "awakened" readily. The holster may be either powered down (with LED dark, a full standby state indicated at 81 or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the user input device or touchscreen.

Figure 9:
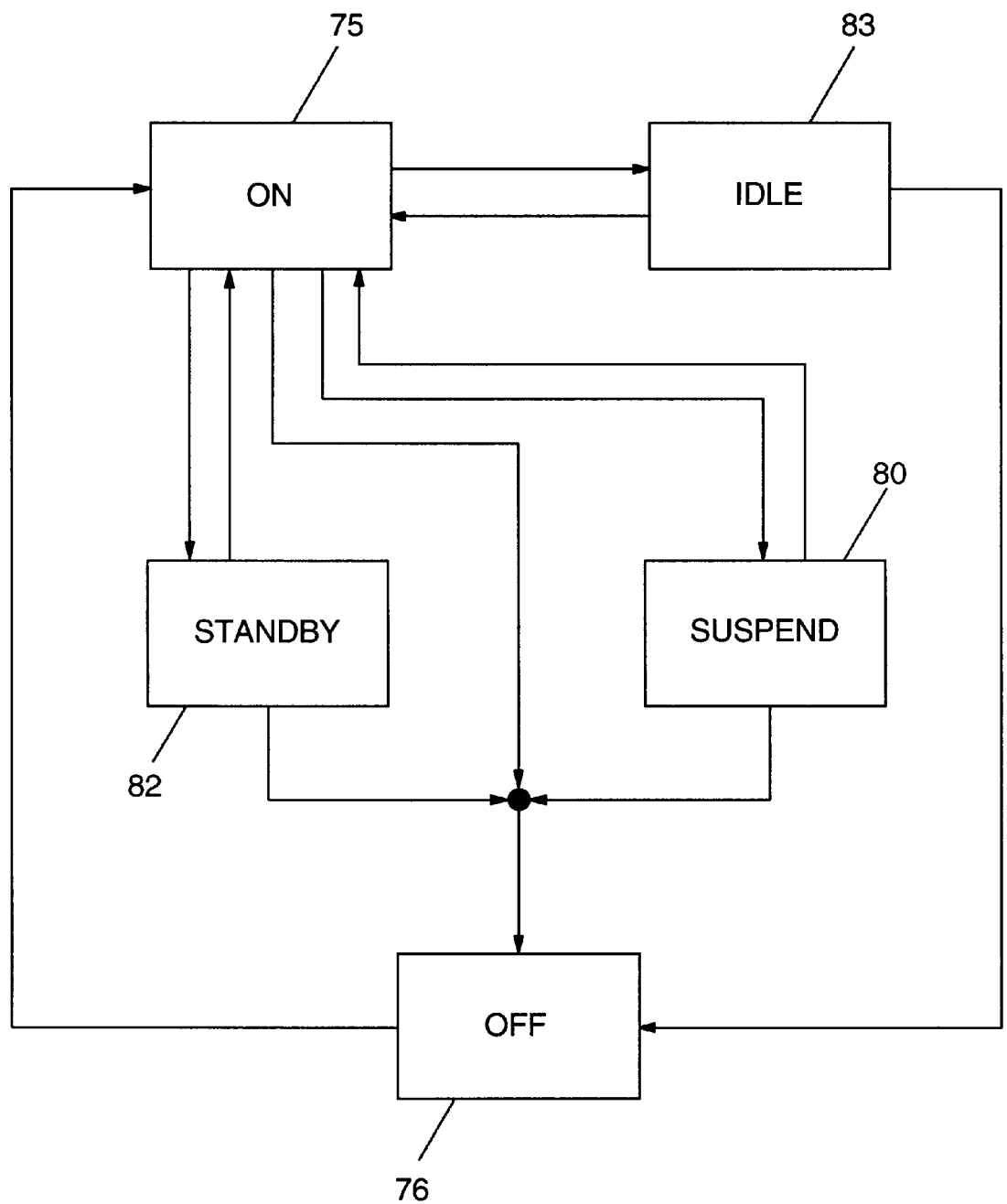
FIG. 9 is a diagram similar to that of FIG. 8 showing the states of certain elements of the mobile client of FIGS. 2 and 3 and including the status of software executing on the mobile client.

Another view of the power modes and transition events is given in FIG. 9. There, the system states are represented as being an On state 75; Idle state 83; Standby state 82; Suspend state 80; and Off state 76. In the On State 75, the system LEDs and LCD are illuminated, the processor 30 is operating in normal high function mode, the microprocessor of the user input device is operating in normal high function mode, application programs are active, and other peripherals are power managed as needed. Passage of time with inactivity will result in the system entering the Idle state 83, in which execution of application programs by the processor has ended, the processor enters a "doze high" mode of power management, the LCD is illuminated, the user input device enters its own Idle state, and other peripherals are power managed as needed. Any user event including keypresses on a keyboard will return the system to the On state. Should the passage of time cause the system to enter the Standby state 82, then application programs become static, the processor enters a "doze low" mode of power management, the LCD is dark, and all other peripherals are power managed as needed. Should the passage of time cause the system to enter the Suspend state 80, application programs become static and are checkpointed for resumption, the processor enters a "sleep" mode of power management, the LCD is darkened, and all other peripherals are off. Thus in terms of time intervals for turnaround to fully active state 75, the system will return most quickly from Idle state 83, less quickly from Standby state 82, less quickly from Suspend state 80, and most slowly from Off state 76.

Figure 10:
FIG. 10 is an illustration of the display screen of the mobile client of FIG. 2 while driven by the execution of an application program on the mobile client to display certain data.

It is now believed instructive to address briefly the display and communication of data as contemplated for the mobile client system of this invention. Referring now more particularly to FIG. 10, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the Internet or World Wide Web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if the wire is connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 10. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the Intensive Care Unit (ICU) and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen as well as by the optional user input device. Thus, referring to FIG. 10, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

In accordance with the present invention, the mobile client system has particular provisions for the management of flash memory. Flash memory is a nonvolatile semiconductor memory that retains data without power supply. It is used mainly for secondary storage, most often as an alternative to disk devices. For an overview of flash memory, see Wells et al U.S. Pat. No. 5,479,633. Flash memory technology has advantages over other secondary storage in low power consumption, high speed, absence of mechanical parts, and small packaging size. These advantages make flash memory most attractive for mobile computing environments, such as portable computers and embedded systems.

Flash memory has unique physical characteristics that affect its operation. The contents cannot be overwritten. A time consuming erase operation must be applied before each write to the same location. Depending upon the memory design, after erase, the value of all bits is 1. Thus, bits can only be changed from I to 0. (In some models, the role of I and 0 are reversed.). Erase can only be applied to large chunks of memory, called erase units (typically 64 to 128 Kbytes). The number times a unit can be erased without compromising reliability is limited (100,000 times on the average).

There are two major types of flash memory technology: NOR and NAND. The main difference is in the access capabilities. NOR technology provides random access. A byte at any location can be read and written individually. With NAND technology, on the other hand, data can only be read and written in larger chunks, called pages (typically 256 bytes). Moreover, within each erase unit, pages can only be written in sequential order.

Obviously, NOR and NAND technologies require different memory management approaches. This invention deals exclusively with NOR technology.

Various methods of flash memory management have been invented (see, for examples, U.S. Pat. Nos. 5,404,485; 5,337,275; 5,473,765; and 5,457,658). All methods have certain common principles. These include that data is written and read in blocks. Each block has a unique identifier, called a virtual address. Flash memory is organized into physical blocks, each having a unique physical address. A write operation uses the next free (erased) physical block in memory. When a given virtual address is re-written, the physical block containing the previous instance of the data is marked inactive. A mapping structure is used to associate each virtual address with its current physical address. Garbage collection is performed in the background. Inactive blocks are reclaimed by moving any active blocks out of a unit, then erasing the unit.

Differences among the various flash memory management methods stem mainly from memory organization, which is often affected by the target system or application environment. Physical blocks have either fixed or variable length. Fixed length blocks are most suitable for disk device emulation, where each block is the size of a disk sector. Variable length blocks provide more flexibility for the target environment. More importantly, they are efficient for storing data in compressed form without fragmentation, since each time a given block is rewritten, its compressed size may change. Other differences are in the mapping from virtual to physical address, and in mechanisms for maintaining data integrity.

This invention presents a method for flash memory management using variable block length and which supports data compression. In accordance with this invention, blocks are allocated contiguously in each erase unit; each block starts with a header that contains the length of the block. Blocks are tracked using a single-level virtual address map which resides in RAM, and can be constructed from scratch upon startup. Operations are provided for reading and writing of data blocks, for clearing erase units, and for creating the virtual address map. Operations keep the memory organization consistent at all times, allowing recovery from a crash without loss of valid data.

There exist several other flash memory management methods that support data compression. In U.S. Pat. Nos. 5,337,275 and 5,479,633, two similar methods are disclosed. They differ from the invention here described in the organization of erase units and in the use of two level address mapping. Each erase unit contains a block map, with pointers to the actual blocks. The block map grows from the top of the unit, whereas blocks are allocated from the bottom of the unit (similar to a heap and stack combination). Mapping proceeds in two steps, from the main map in RAM to the block map in flash memory. Also, data integrity is maintained by means of revision numbers in the block map, which induce a temporal order among multiple physical blocks of the same virtual address. In the present invention, on the other hand, integrity is achieved by means of invariance conditions on the states of the blocks.

In other technical literature, an entirely different approach is used. The memory is divided into small fixed size blocks called cells. Data of arbitrary length is written into as many cells as required, not necessarily contiguous. The cells are then chained together in a linked list.

Turning now to the detail of the memory organization and the operations which define this invention, data targeted for storage in flash memory is organized in blocks, possibly of variable length. Each data block is identified by a virtual address. For example, when flash memory is used as disk device emulator, each disk sector is a data block, and the virtual address is the sector number Flash memory consists of multiple erase units. Each erase unit presents a contiguous address space. Erase units are numbered sequentially, starting with unit 0.

Figure 11:
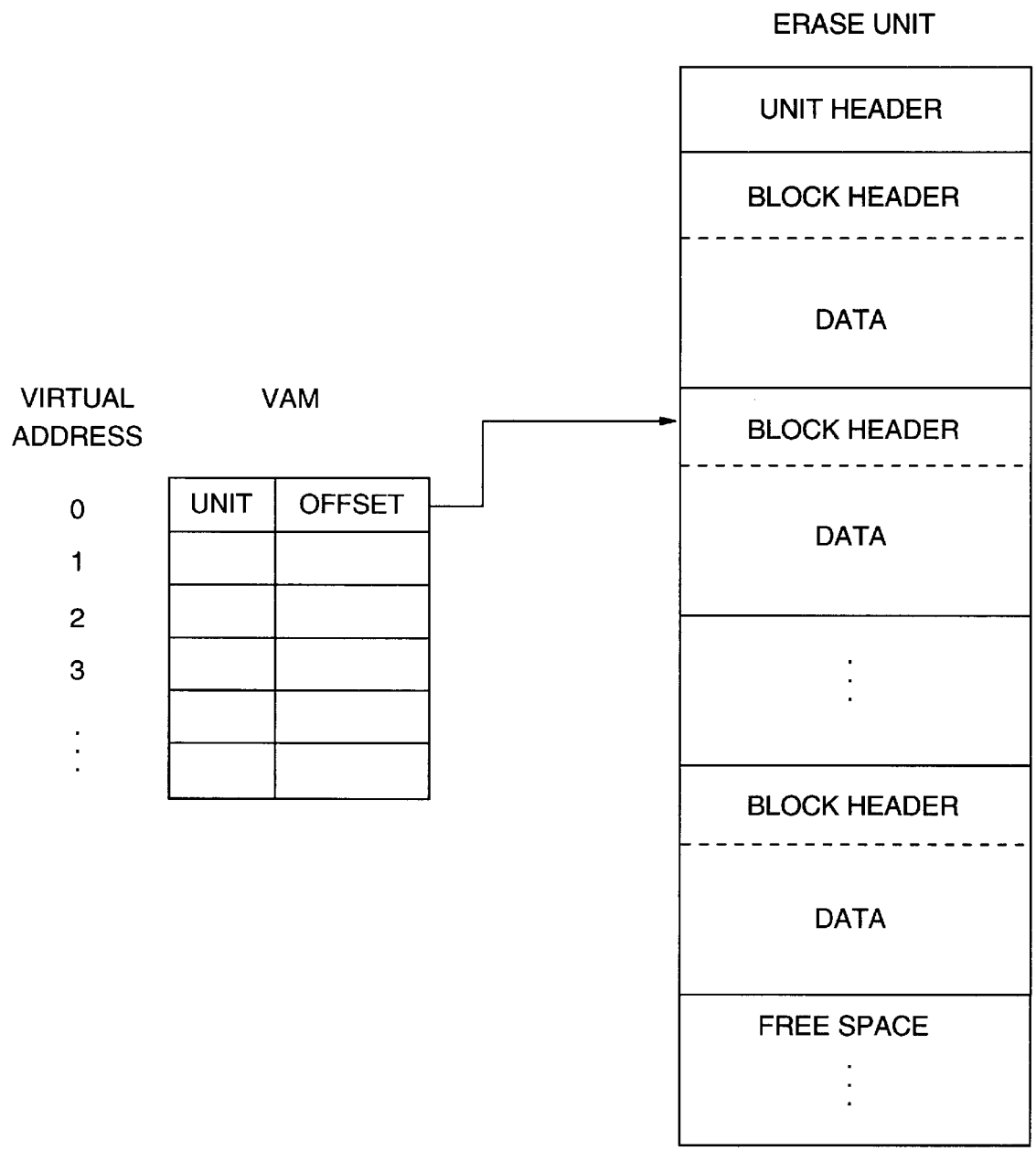
FIG. 11 is a schematic representation of flash memory management in accordance with this invention.

An erase unit is organized as shown in FIG. 11: a unit header at offset 0; followed by a contiguous sequence of memory blocks of variable length, called physical blocks. The unit header contains the unit number, as well as other operational and statistical attributes of the unit which are irrelevant to this invention.

Each virtual data block is stored in a single physical block in one of the erase units. Data may optionally be stored in compressed form. The decision whether a given data block should be compressed is not part of this invention. We assume this is specified explicitly during data transfer, or there exists a default. Data is compressed upon being written, and uncompressed upon being read. The method of compression is irrelevant to this invention.

We henceforth use the term "block" both for a physical block in memory and for a virtual data block. The interpretation becomes clear from the context.

Blocks are allocated contiguously in the erase unit, starting immediately after the unit header. A block consists of a block header, followed by data of variable length. The header of the next block is located immediately after the data of the previous block.

The block header contains the length of the stored data, the virtual address (back pointer), and a specification of whether or not the stored data is compressed.

Each block has a unique physical address, consisting of the erase unit number, followed by the offset from the beginning of the unit to the block header.

Headers can optionally be aligned to a predefined boundary (e.g., full word, double word, etc.), depending on the alignment properties of the hardware write mechanisms. In this case, some least-significant bits can be eliminated from the physical address.

The Virtual Address Map (VAM) (see FIG. 11) maps each virtual address to the physical address of a block in flash memory. VAM entries are indexed by virtual address. By convention, if the offset field in the physical address is 0, there is currently no memory block associated with the given virtual address (offset 0 in the erase unit contains the unit header).

At runtime, the VAM is kept in RAM memory. It can be constructed from scratch at flash memory startup, by scanning all the block headers . It is necessary to explicitly initialize the offset fields in the VAM to 0.

Some flash memory management methods referred to above maintain a block allocation map in each erase unit, entailing a two-level tracking of physical blocks. In this invention, blocks are tracked directly from the VAM.

Consider a typical flash memory device of size 16 Mbytes, comprising 128 erase units, each of size 128 Kbytes. A typical data block stored in flash memory has uncompressed length 0.5–4 Kbytes. Assuming an average compression rate of 2–4, the compressed data length is 0.125–2 Kbytes. An erase unit can thus comprise up to 1K blocks. This supports a maximum of 128K virtual addresses. A physical address consists of 7 bits for erase unit number, and 17 bits for offset. The VAM thus requires 384 Kbytes of RAM storage.

In order to leave sufficient space for data rewrite without flash-erase, and to enable efficient garbage collection in the background, the virtual address space provided should be significantly smaller than the maximum performance studies reported in the technical literature advise leaving up to 30% of the address space unused. This reduces the space requirements for the VAM by a similar amount.

If RAM space is at a premium, the mapping approach could be modified, at the expense of access time. The VAM would contain only the unit number (requiring significantly less space). A small associative cache (in RAM) would contain the virtual address and full physical address of the most recently used blocks. To access a virtual address not in the cache, the unit number is obtained from the VAM, then the unit is scanned to locate a block header with the given virtual address.

Following is a description of the fields in the block header. Additional fields may be defined in an actual implementation, but these are irrelevant to this invention.

By convention in this description, after flash-erase, all bits in the erased unit are set to 1. Bits can only be written to 0.

State (4 bits)
A block can be in one of four states.
Free (1111) This state indicates that the memory, from this header to the end of the erase unit, is in the erased state and available for allocation of new blocks.
Allocated (1110) The block is allocated and in the process of being written.
Ready (1100) The block has been written successfully and is ready to replace the currently active block of the given virtual address.
Active (1000) The block contains current data of the given virtual address.
Deleted (0???) The block has been logically deleted ("?" means "don't care").
Length (e.g. 12 bits) This is the length of the stored data (not including the header). Length 0 is possible from the standpoint of data organization; the semantics of an empty block are irrelevant to this invention. Length X'FFF' is equivalent to length 0. This is relevant when the VAM is rebuilt after crash. 12 bits allow a block length of 4 Kbytes. This field could be narrower or wider, depending on the requirements of the implementation environment.
Virtual address (e.g. 16 bits) The virtual address is used in constructing the VAM during startup. 16 bits allow 64K virtual addresses. This field could be narrower or wider, depending on the size of the flash memory being used and the requirements of the implementation environment.
Attributes This field contains various attributes of the data block. One such attribute is a compression flag, indicating whether the stored data is compressed (1) or uncompressed (0). Other attributes could, for example, describe the compression method.
ECC This optional field is an error correction code, calculated for all fields of the header except the state (the latter may change after the ECC is set).

A state value other than those defined above is an indication that the state field is corrupted. There is no need to explicitly initialize the state of block headers to "free" after flash erase. The state "allocated" can be alternatively implemented as the following combination: state "free", and length not X'FFF'. With this, the number of bits in the state field can be reduced to 3. State values are such that every state transition in the operations defined in this invention can be done by a single bit change.

For data integrity, each block header should have two copies in flash memory. The relative location of the two copies should be such that the hardware mechanisms cannot corrupt both copies simultaneously during failure. This provides protection against (at least) single failures. When, due to failure, the two copies of some field (other than the state) are not identical, the correct value can be recovered using the ECC. As for the state, if the two copies are not identical, the state field is considered corrupted and the block must be deleted.

The following invariance conditions are maintained at all times by the operations defined in this invention.

1. There exists at most one block in state "active" for each virtual address at all times.

2. There exists at most one block in state "ready" for each virtual address at all times.

3. There exists at most one block in state "allocated" in each erase unit at all times.

The invariance conditions guarantee data integrity. This enables rebuilding the VAM after crash without loss of valid data. It is also required in environments where multiple operations proceed in parallel (which may also entail synchronization, e.g. via locks).

Some flash memory management methods (e.g. U.S. Pat. Nos. 5,457,658 and 5,479,633) use revision numbers in block headers or in unit headers, to induce temporal order among multiple blocks of a given virtual address. In this invention, maintaining the invariance conditions alleviates the need for revision numbers. The flash memory management in U.S. Pat. No. 5,473,765 uses a 3-bit state field, which cannot support both a "ready" and an "active" state. Invariance conditions similar to this invention cannot be imposed, resulting in nondeterministic recovery and possible loss of valid data.

Memory management in accordance with this invention makes use of the following defined operations.

Read Block—Read the data block at a given virtual address.

Write Block—Write the data block at a given virtual address.

Clear Unit—Move the "active" data blocks of a given erase unit to other locations and flash-erase the unit. This operation is normally part of a larger activity of garbage collection. Aspects of garbage collection, particularly which unit to select for clearing, are beyond the scope of this invention.

Build VAM—Build the VAM at flash memory startup. If the flash memory has crashed in the middle of an operation, it is recovered to a consistent state.

To guarantee availability of sufficient free space for write at all times, a pool of erased units is maintained. Garbage collection works in the background to keep the number of erased units above a predetermined threshold (e.g. 8) at all times.

Also maintained is a working set of writeable units (e.g. 4 to 8), which are used for allocation of new blocks. The working set is distinct from the pool of erased units. For each unit in the working set, a pointer (offset) to the first free location in the unit is kept (in RAM). Garbage collection must not be applied to the working set.

A unit is moved from the pool of erased units to the working set when additional space for writing is required. To keep the working set from growing, when a unit is added, some other unit (preferably a full one) should be removed.

Having multiple units being filled concurrently is useful due to the variable block size. An efficient storage allocation policy should be implemented. For example, blocks of different size groups (small, medium, etc.) can be allocated in different units; units can be grouped by remaining free space. Such considerations are beyond the scope of thus invention.

In a Read Block operation, a virtual address is given as a parameter. A data block and length are returned. The operation includes:

1. Read from the VAM the physical address (unit and offset) associated with the given virtual address.

2. If offset=0, no data exists in flash memory for this virtual address. Return an error.

3. Read the state, length, and compression flag from the header of the block.

4. If the state is not "active" do the following. (Note: the state is corrupted.)

4.1. Change the state in the header of the block to "deleted".

4.2. Change the offset to 0 in the VAM entry for the given virtual address.

4.3. Return an error message.

5. If length=0 (the block is empty), return a message.

6. Read the data from the block.

7. If compression=1 uncompress the data and get the length of the uncompressed data. The method of (de)compression used in Step 7 is irrelevant to this invention.

In a Write Block operation, a virtual address, length and compression flag are given as parameters. The compression flag and length could also have default values. The operation includes:

1. If compression=1 compress the data and get the length of the compressed data.

2. Select (using the implemented allocation policy) from the working set a unit with sufficient free space. If space in the working set is insufficient, select a unit from the pool of erased units and add it to the working set (possibly remove some other unit); if the pool is empty (highly unlikely), wait until it is replenished by garbage collection.

3. Locate (using the free space pointer for the selected unit) the first block header in "free" state in the unit (this is called the "new block"); change the state in the header of the new block to "allocated".

4. Write the length, virtual address, compression flag and ECC in the header of the new block. (Update the free space pointer for this unit in the working set.)

5. Write the (possibly compressed) data into the new block.

6. Change the state in header of the new block to "ready".

7. Read from the VAM the physical address (unit and offset) associated with the given virtual address (this is called the "old block").

8. If an old block exists (offset) change the state in the header of the old block to "deleted".

9. Change the state in header of the new block to "active".

10. Write the physical address (unit and offset) of the new block in the VAM entry for the virtual address.

The method of compression used in Step 1 is irrelevant to this invention. The allocation policy used in Step 2 for selecting a unit from the working set is beyond the scope of this invention. The selected unit must not have any block in "allocated" state. The sequence of state changes in Steps 6 to 9 enable the flash memory to sustain a crash in the middle of the write operation. A (unique) block can always be designated "active" when the VAM is rebuilt.

When a Clear Unit operation occurs a unit number is given as parameter. The unit is assumed not in the working set of writeable units. Consequently, there is no block in "allocated" or "ready" state in this unit. The operation includes the steps of:

1. Scan all blocks in the unit sequentially; use the length field in the block header to go from one block to the next. For each block being scanned (called the "current block") do the following.

1.1. Read the state, length and virtual address fields from the header of the current block.

1.2. If the state of the current block is "active" do the following.

1.2.1. Select (using the implemented allocation policy) from the working set a unit with sufficient free space; if space in the working set is insufficient, select a unit from the pool of erased units and add it to the working set (possibly remove some other unit).
1.2.2. Locate (using the free space pointer for the selected unit) the first block header in "free" state in the selected unit (this is called the "new block"); change the state in the header of the new block to "allocated".
1.2.3. Copy all fields except the state from the header of the current block to the header of the new block.
1.2.4. Copy the data from the current block to the new block.
1.2.5. Change the state in header of the new block to "ready".
1.2.6. Change the state in header of the current block to "deleted".
1.2.7. Change the state in header of the new block to "active".
1.2.8. Write the physical address (unit and offset) of the new block in the VAM entry for the virtual address.
1.3. Else if the state of the current block is corrupted do the following.
1.3.1. Read from the VAM the physical address (unit and offset) associated with the current virtual address.
1.3.2. If the physical address in the VAM entry points to the current block, set the offset in the VAM entry to 0.
2. (All blocks in the unit have been scanned.) Flash-erase the unit and place it in the pool of erased units.

The sequence of state changes in Steps 1.2.5 to 1.2.7 enable the flash memory to sustain a crash during the clear operation. A (unique) block can be designated "active" for the given virtual address when the VAM is rebuilt. The selected unit must not have any block in "allocated" state. The allocation policy used for selecting a unit in Step 1.2.1 is beyond the scope of this invention. Depending on garbage collection performance considerations, this operation may require its own working set, distinct from the one used by write-block.

During the Build VAM operation, a list is built in RAM, containing the physical addresses of blocks which are in "ready" state. The list is discarded at the completion of the operation. The operation includes the steps of:
1. Allocate the space for the VAM, and initialize all offsets to 0.
2. Scan all the blocks in the entire flash memory; use the length field in the block header to go from one block to the next in each unit. For each block being scanned (called the "current block") do the following.
2.1. Read the state, virtual address and length from the header of the current block.
2.2. If the state of the current block is "ready", do the following.
2.2.1. Get the physical address (unit and offset) in the VAM entry for the virtual address (this is called the "previous block").
2.2.2. If a previous block exists (offset not 0) do the following. (Note: the state of the previous block is "active".)
2.2.2.1. Change the state in the header of the previous block to "deleted".
2.2.2.2. Change the state in the header of the current block to "active".
2.2.3. Else (no previous block exists) add the physical address of the current block to a list of "ready" blocks.
2.2.4 Write the physical address of the current block in the VAM entry for the virtual address.
2.3. Else if the state of the current block is "active" do the following.
2.3.1. Get the physical address (unit and offset) in the VAM entry for the virtual address (this is called the "previous block").
2.3.2. If a previous block exists (offset not 0), do the following. (note: the state of the previous block is "ready").
2.3.2.1. Change the state in the header of the current block to "deleted".
2.3.2.2. Change the state in the header of the previous block to inactive".
2.3.3. Write the physical address of the current block in the VAM entry for the virtual address.
2.4. Else if the state of the current block is not "free" do the following. (Note:
the state is either "allocated", or "deleted", or corrupted).
2.4.1. If length=X'FFF' (the length field was not set) set the length field in the header of the current block to 0.
2.4.2. Change the state in the header of the current block to "deleted".
3. (All blocks in the flash memory have been scanned). For each physical address on the list of "ready" blocks, change the state in the header of the block to "active".

In Step 2.2.3, the reason the block is added to the list of "ready" blocks is that at this point it is not known whether there exists a block in "active" state for the given virtual address. The state of the "ready" block is changed to "active" either when the "active" block is found (Step 2.3.2), or after the entire memory has been scanned (step 3). The sequence of state changes in Step 2.2.2 and 2.3.2 enables the flash memory to sustain a crash, even during the build operation, without losing valid data.

In the drawings and specification there has been set forth a preferred embodiment of the invention and, although specific terms are used, the description thus given uses terminology in a generic and descriptive sense only and not for purposes of limitation.

What is claimed is:

1. A mobile client computer system comprising:
a housing sized to be held and manipulated by the hand of a user;
a processor mounted within said housing for processing digital data;
random access memory mounted within said housing for storing digital data and coupled to said processor;
flash memory coupled to said processor for storing in a plurality of erase units variable length blocks of digital data;
a display mounted in said housing and coupled to said processor and said random access memory for displaying information derived from digital data processed by said processor;
an input digitizer mounted in said housing and overlaying said display, said digitizer being coupled to said processor for input of digital data by a user; and
a flash memory management control program stored in said random access memory and accessible by said processor for managing data stored in said flash memory,
said flash memory management control program and said processor cooperating, when said control program is executing, in
(1) establishing a virtual address map for blocks of data stored in said flash memory, and (2) allocating within erase units of said flash memory contiguous blocks each having a header and a variable length data field.

2. A mobile client computer system according to claim 1 wherein said virtual address map is stored in said random access memory.

3. A mobile client computer system according to claim 1 wherein data stored in said variable length data field in said flash memory is compressed.

4. A mobile client computer system according to claim 1 wherein said flash memory management control program allocates blocks within said flash memory with the header of one block located immediately after the data of the next previous block.

5. A mobile client computer system according to claim 1 wherein the header of each allocated block contains information defining the length of the associated data field, the virtual address, and a specification of whether the data stored is compressed.

6. A computer comprising:

a housing;

a processor mounted within said housing and processing digital data;

random access memory mounted within said housing for storing digital data and coupled to said processor;

flash memory coupled to said processor for storing in a plurality of erase units variable length blocks of digital data;

a display coupled to said processor and said random access memory for displaying information derived from digital data processed by said processor;

an input device coupled to said processor for input of digital data by a user; and a flash memory management control program stored in said random access memory and accessible by said processor for managing data stored in said flash memory, said flash memory management control program and said processor cooperating, when said control program is executing, in
(1) establishing a virtual address map for blocks of data stored in said flash memory, and
(2) allocating within erase units of said flash memory contiguous blocks each having a header and a variable length data field.

7. A computer system according to claim 6 wherein said virtual address map is stored in said random access memory.

8. A computer system according to claim 6 wherein data stored in said invariable length data field in said flash memory is compressed.

9. A computer system according to claim 6 wherein said flash memory management control program allocates blocks within said flash memory with the header of one block located immediately after the data of the next previous block.

10. A system according to claim 6 wherein said header of each allocated block contains information defining the length of the associated data field, the virtual address, and a specification of whether the data stored is compressed.

11. A display generating system comprising:

a housing;

a processor mounted within said housing and processing digital data;

random access memory mounted within said housing for storing digital data and coupled to said processor;

flash memory coupled to said processor for storing in a plurality of erase units variable length blocks of digital data;

said processor and said random access memory and said flash memory cooperating in supplying digital data driving a display of visual images; and a flash memory management control program stored in said random access memory and accessible by said processor for managing data stored in said flash memory, said flash memory management control program and said processor cooperating, when said control program is executing, in
(1) establishing a virtual address map for blocks of data stored in said flash memory, and
(2) allocating within erase units of said flash memory contiguous blocks each having a header and a variable length data field.

12. A system according to claim 11 wherein said virtual address map is stored in said random access memory.

13. A system according to claim 11 wherein data stored in said variable length data field in said flash memory is compressed.

14. A system according to claim 11 wherein said flash memory management control program allocates blocks within said flash memory with the header of one block located immediately after the data of the next previous block.

15. A system according to claim 11 wherein said header of each allocated block contains information defining the length of the associated data field, the virtual address, and a specification of whether the data stored is compressed.

* * * * *